May 20, 1924.
E. J. BARNETT
THROTTLING MECHANISM
Filed March 22, 1923
1,495,064
2 Sheets—Sheet 1
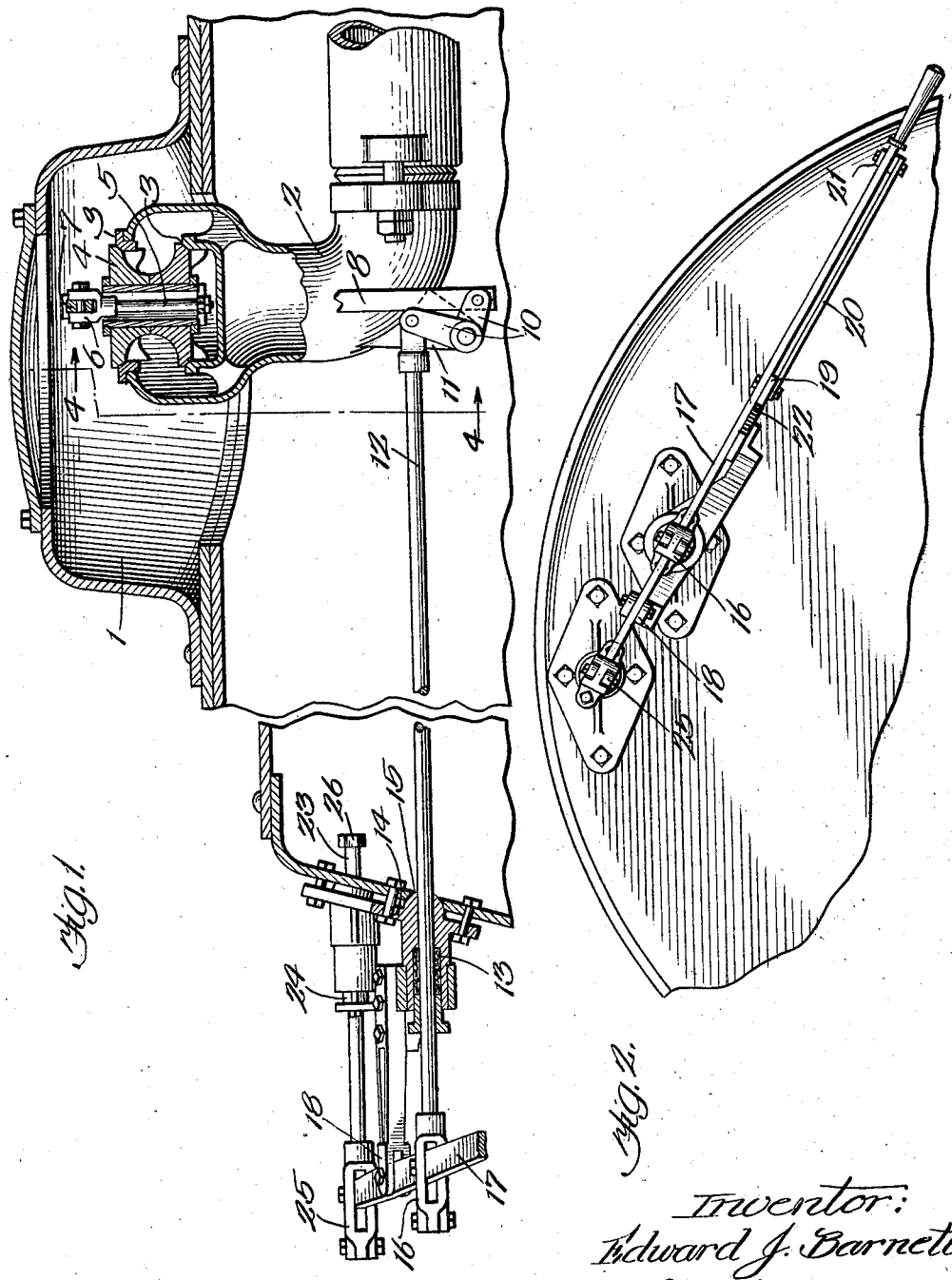

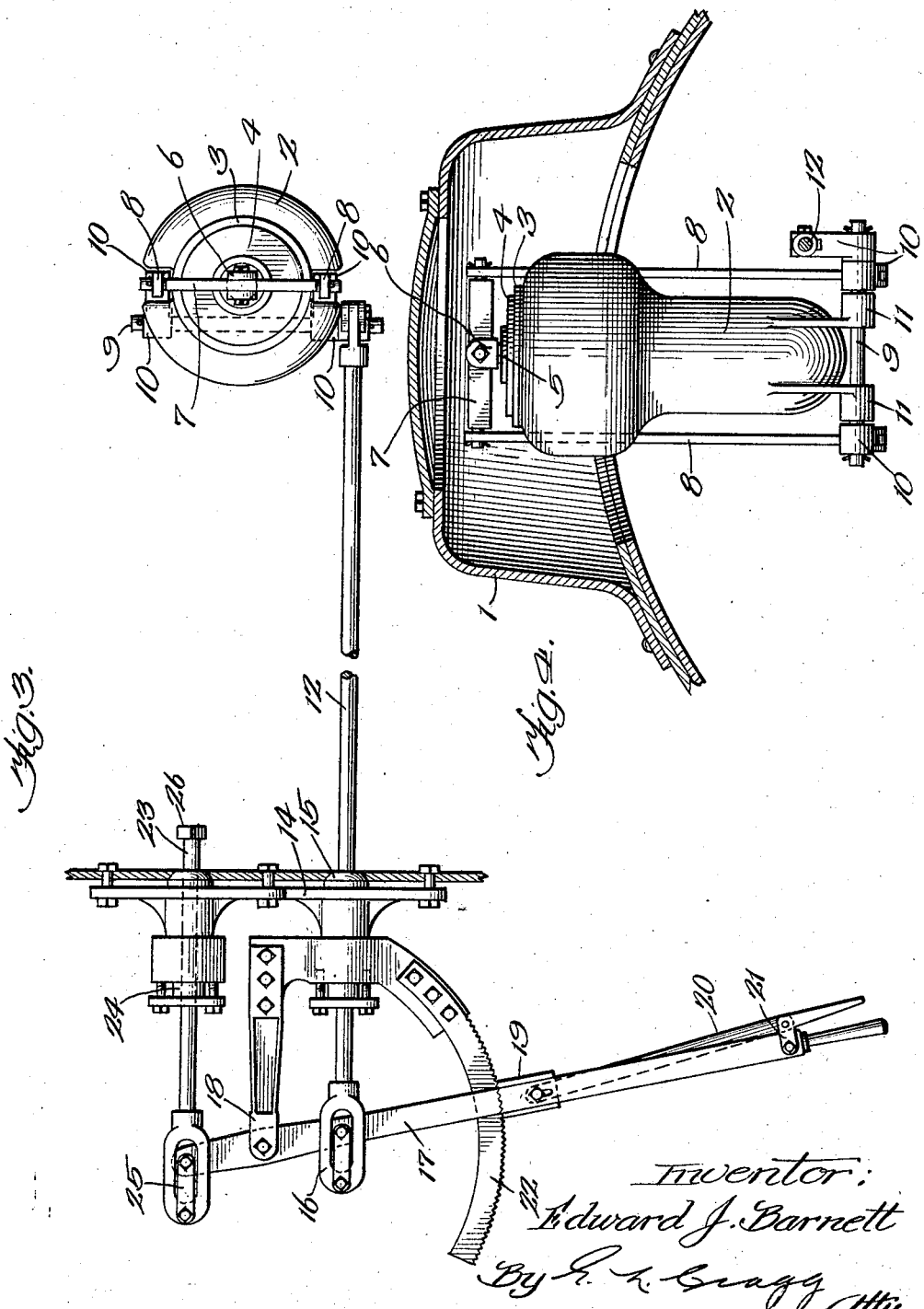

Patented May 20, 1924.

1,495,064

UNITED STATES PATENT OFFICE.

EDWARD J. BARNETT, OF CHICAGO, ILLINOIS.

THROTTLING MECHANISM.

Application filed March 22, 1923. Serial No. 626,785.

*To all whom it may concern:*

Be it known that I, EDWARD J. BARNETT, citizen of the United States, residing at Chicago, in the county of Cook and State of Illinois, have invented a certain new and useful Improvement in Throttling Mechanism, of which the following is a full, clear, concise, and exact description.

My invention relates to throttling mechanism and is of particular utility when adapted to locomotives, though the invention is not to be limited to its use in connection with engines nor to the control of any particular fluid. The throttling mechanism of a locomotive includes a balanced valve located in the steam chamber and in the piping that distributes the steam to the engine cylinders. The mechanism for operating the valve includes an actuating rod connected with the balanced valve upon the interior of the steam chamber and projecting to the exterior of the steam chamber through a stuffing box, there being a throttle lever upon the exterior of the chamber that is assembled with the exterior end of the rod whereby the balanced valve may be adjusted. The throttle lever carries a holding dog that is engageable with an arcuate rack for the purpose of holding the lever and valve controlled thereby in any selected adjustment, this holding dog being adjustable with respect to the lever and with respect to the arcuate rack to bring it in and out of action.

The balanced valves are apt to open gradually if the holding dogs fail to function, due to the unopposed outward thrusting pressure which is exerted upon the rods by the steam within the steam chambers.

In carrying out my invention I cause an opposing pressure upon said rod to be exerted by the steam within the steam chamber and to this end the throttle lever is continued beyond its fulcrum into connection with another rod that projects through another stuffing box into the steam chamber and which presents a surface that receives outward thrusting pressure of the steam within the chamber, this surface being of a size to secure the desired opposing pressure, this pressure preferably being equal to the pressure exerted upon the actuating rod of the balanced valve.

The fulcrum for the throttle lever being between the two rods, it is obvious that the pressure of the steam within the steam chamber will exert outward pressure upon both rods to cause opposing turning moments upon the throttle lever that are of selected degrees determined by the end surfaces upon the rods exposed to the steam within the steam chamber and the distances between the rods and the fulcrum of the throttle lever. The desired results are thus accomplished without the addition of any load upon the throttle lever, the load upon this lever being, on the contrary, reduced.

The invention will be more fully explained by reference to the accompanying drawings in which Fig. 1 is a longitudinal sectional view of a portion of a locomotive boiler having the throttle mechanism of my invention; Fig. 2 is a front view of the structure shown in Fig. 1; Fig. 3 is a plan view; and Fig. 4 is a view on line 4—4 of Fig. 1.

Like parts are indicated by similar characters of reference throughout the different figures.

I have illustrated the steam chamber 1 of a locomotive boiler. Piping leads from this steam chamber to the cylinders of the engine, this piping terminating in a single branch 2 within the steam chamber. The inlet end of the piping is open for the reception of steam from the steam chamber, the piping being equipped with valve seats 3 for a balanced valve 4 that is in valving relation to the port defined by this seat. This balanced valve has a stem 5 terminating in a yoke 6 that embraces the bar 7. The ends of this bar are connected by links 8 with a rod 9 that freely passes through the lower ends of the links and through one end of each of the bell crank levers 10. These bell crank levers are pivoted at their elbows upon the brackets 11 formed upon the piping 2. A rod 12 is linked with the other end of one of the bell crank levers and passes through a stuffing box 13 supported by a mounting 14 universally seated within the opening 15 in the front wall through which the rod 12 passes, as is well known by those familiar with the art. The end of the rod 12 that is upon the exterior of the casing has the usual flexible connection 16 with the throttle lever 17. This throttle lever is fulcrumed upon the post or other support 18 that is carried by the aforesaid mounting 14.

A holding dog 19 is slidably mounted upon the throttle lever to be movable longitudinally thereof by the lever 20 assembled at one end with the holding dog and assembled at its other end with the throttle lever 17 by the linkage 21, the handles of the two levers being adjacent as usual. The arcuate rack 22 is concentric with the fulcrum of the throttle lever and is formed with teeth upon the side thereof facing the dog 19 whereby the throttle lever may be held in any position to which it is adjusted to maintain the desired adjustment of the balanced valve.

In order to overcome any creeping opening action of the balanced valve due to imperfect holding engagement of the dog 19 with the arcuate rack 22 and outward pressure exerted upon the rod 12 by the steam within the steam chamber, I employ an additional rod 23 that projects through a stuffing box 24 (also carried by the mounting 14) into the steam chamber and which is connected at its outer end by a flexible connection with a portion of the lever 17 extended beyond its fulcrum. The two rods 12 and 23 are thus in opposition, the rod 23 having a suitable inner end formation such as the applied nut 26 to maintain it in assembly. The outward pressure of the steam within the chamber upon the rod 23 may be suitably proportioned to the outward pressure of the steam upon the rod 12 by correspondingly proportioning the cross sectional area of the portions of the rods which pass through their stuffing-boxes.

In practice the fulcrum of the lever 17 is desirably between and equidistant from the rods 12 and 23 and the surfaces upon the inner ends of these rods are desirably such that the outward pressure exerted upon the rods by the steam is equal. There is thus provided a means for holding the balanced valve in adjustment that supplements the holding rack 22 and the holding dog 19 whereby the valve may be held in position in the event that the rack and dog are out of service or are imperfectly performing their function.

While the invention is shown as being adapted to steam engines employing steam as the motive fluid under pressure, yet the invention is not to be limited to steam engines nor to the control of fluid under pressure that is employed for operating engines.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:—

1. The combination with a chamber for containing fluid under pressure, there being a port through which fluid may be conveyed from the chamber; of a balanced valve for said port; a rod having operating connection with the balanced valve within the chamber and extending through the chamber to the exterior thereof; a throttle lever connected with the outer end of said rod; a support upon which said lever is fulcrumed; and a second rod also extending into said chamber and having an exterior end connected with said lever, the fulcrum of the lever being interposed between said rods, the portions of the rods within the chamber having surfaces upon which the fluid within the chamber exerts opposing outwardly thrusting pressures.

2. The combination with a chamber for containing fluid under pressure, there being a port through which fluid may be conveyed from the chamber; of a balanced valve for said port; a rod having operating connection with the balanced valve within the chamber and extending through the chamber to the exterior thereof; a throttle lever connected with the outer end of said rod; a support upon which said lever is fulcrumed; and a second rod also extending into said chamber and having an exterior end connected with said lever, the fulcrum of the lever being between and substantially equidistant from said rods, the portions of the rods within the chamber having surfaces upon which the fluid within the chamber exerts opposing outwardly thrusting pressures.

3. The combination with a chamber for containing fluid under pressure, there being a port through which fluid may be conveyed from the chamber; of a balanced valve for said port; a rod having operating connection with the balanced valve within the chamber and extending through the chamber to the exterior thereof; a throttle lever connected with the outer end of said rod; a support upon which said lever is fulcrumed; and a second rod also extending into said chamber and having an exterior end connected with said lever, the fulcrum of the lever being between and substantially equidistant from said rods, the portions of the rods within the chamber having surfaces upon which the fluid within the chamber exerts opposing outwardly thrusting pressures, the inner portions of said rods presenting surfaces to the fluid within the fluid chamber which will cause the fluid to exert substantially equal outwardly thrusting pressures upon said rods.

4. The combination with a chamber for containing fluid under pressure, there being a port through which fluid may be conveyed from the chamber; of a valve for said port; a rod having operating connection with the valve within the chamber and extending through the chamber to the exterior thereof; a throttle lever connected with the outer end of said rod; a support upon which said lever is fulcrumed; and a second rod also extending into said chamber and having an exterior end connected with said lever, the fulcrum of the lever being interposed between said rods, the portions of the rods within the chamber having surfaces upon which the fluid within the chamber exerts opposing outwardly thrusting pressures.

5. The combination with a chamber for containing fluid under pressure, there being a port through which fluid may be conveyed from the chamber; of a valve for said port; a rod having operating connection with the valve within the chamber and extending through the chamber to the exterior thereof; a throttle lever connected with the outer end of said rod; a support upon which said lever is fulcrumed; and a second rod also extending into said chamber and having an exterior end connected with said lever, the fulcrum of the lever being between and substantially equidistant from said rods, the portions of the rods within the chamber having surfaces upon which the fluid within the chamber exerts opposing outwardly thrusting pressures.

6. The combination with a chamber for containing fluid under pressure, there being a port through which fluid may be conveyed from the chamber; of a valve for said port; a rod having operating connection with the valve within the chamber and extending through the chamber to the exterior thereof; a throttle lever connected with the outer end of said rod; a support upon which said lever is fulcrumed; and a second rod also extending into said chamber and having an exterior end connected with said lever, the fulcrum of the lever being between and substantially equidistant from said rods, the portions of the rods within the chamber having surfaces upon which the fluid within the chamber exerts opposing outwardly thrusting pressures, the inner portions of said rods presenting surfaces to the fluid within the fluid chamber which will cause the fluid to exert substantially equal outwardly thrusting pressures upon said rods.

7. The combination with a chamber for containing fluid under pressure, there being a port through which fluid may be conveyed from the chamber; of a balanced valve for said port; mechanism having operating connection with the valve within the chamber and extending to the exterior of the chamber; and an element having a portion within the chamber upon which the fluid may exert outward thrusting pressure, this element being coupled with the aforesaid mechanism to oppose the outward thrusting pressure exerted upon said mechanism by the fluid.

8. The combination with a chamber for containing fluid under pressure, there being a port through which fluid may be conveyed from the chamber; of a valve for said port; mechanism having operating connection with the valve within the chamber and extending to the exterior of the chamber; and an element having a portion within the chamber upon which the fluid may exert outward thrusting pressure, this element being coupled with the aforesaid mechanism to oppose the outward thrusting pressure exerted upon said mechanism by the fluid.

In witness whereof, I hereunto subscribe my name this 12th day of March A. D., 1923.

EDWARD J. BARNETT.